Figure 1:
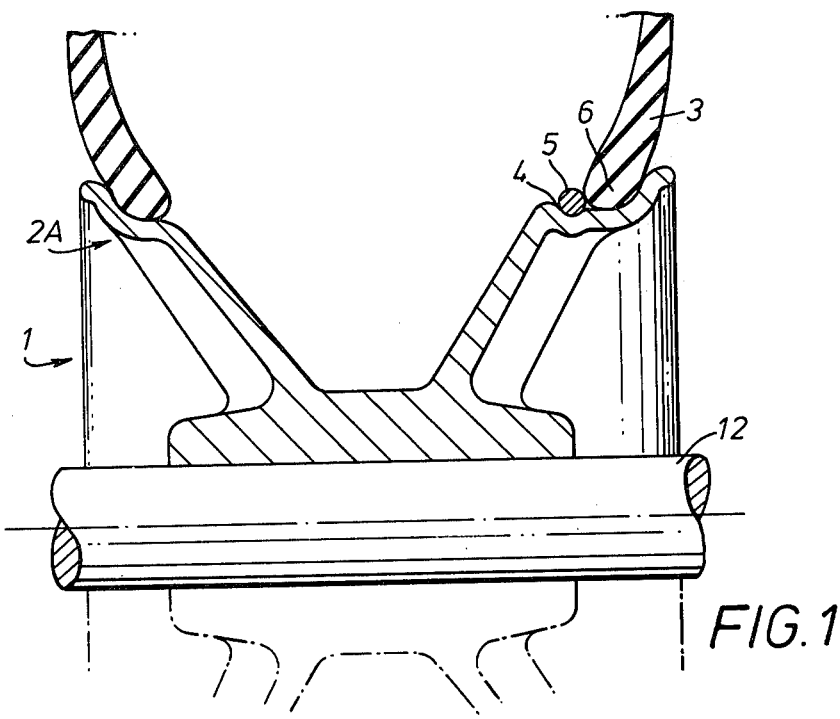

United States Patent [19]

Power

[11] 4,422,490
[45] Dec. 27, 1983

[54] VEHICLE ROAD WHEELS AND TIRES

[75] Inventor: Derek J. Power, Chiswick, England

[73] Assignee: Minilite Limited, Great Britain

[21] Appl. No.: 233,090

[22] Filed: Feb. 10, 1981

[30] Foreign Application Priority Data

Feb. 13, 1980 [GB] United Kingdom ............... 8004732

[51] Int. Cl.³ .................... B60C 5/16; B60B 3/08
[52] U.S. Cl. ........................... 152/394; 301/63 DS
[58] Field of Search ............... 152/375, 378 R, 379.4, 152/379.3, 381.4, 381.6, 382, 383, 389–391, 394–398, 405, 403, 404, 411; 29/159.1, 159.01; 301/10 R, 11 R, 63 DS, 63 D

[56] References Cited

U.S. PATENT DOCUMENTS

| | | | |
|---|---|---|---|
| 1,412,034 | 4/1922 | Banschbach | 301/63 DS |
| 1,415,427 | 5/1922 | Betzell | 301/63 D |
| 1,504,689 | 8/1924 | Hale | 301/11 R |
| 2,187,777 | 1/1940 | Gannett | 152/379.3 |
| 2,484,532 | 10/1949 | Sinclair | 152/394 |
| 3,283,800 | 11/1966 | Iskhinger et al. | 152/397 |
| 3,895,667 | 7/1975 | Mitchell | 152/378 R |

FOREIGN PATENT DOCUMENTS

| | | | |
|---|---|---|---|
| 1172562 | 6/1964 | Fed. Rep. of Germany | 152/381.4 |
| 686145 | 1/1953 | United Kingdom | 152/381.6 |

Primary Examiner—H. Grant Skaggs
Attorney, Agent, or Firm—Poms, Smith, Lande & Rose

[57] ABSTRACT

A vehicle road wheel is disclosed having a safety groove adjacent its outboard rim edge but so as to be within a tire fitted to the wheel and within which a flexible band is fitted so that a tire fitted to the wheel has it outboard bead embraced between the flexible band and the outboard rim edge of the wheel. This enables the the configuration of the wheel rim to be simplified and hence the risk of damaging a tire when fitting it is minimized. The safety groove can be in a tire sealing member of annular form that is held in position around the wheel by inboard and outboard rim parts that are releasably secured together, this sealing member defining the outboard rim edge of the wheel. There are also disclosed, where the sealing member is present, inboard and outboard non-rigid torque transfer bands respectively fitted to the inboard and outboard rim parts and with which the sealing member is engaged.

6 Claims, 4 Drawing Figures

VEHICLE ROAD WHEELS AND TIRES

This invention relates to vehicle road wheels and tires.

In order that tyres are safely retained on vehicle road wheels it has been customary to provide so-called safety humps and ledges, on the wheels, with which the beads of the tires co-operate. The problem arises, however, that the height required for these humps safely to retain the very large tires used for competition purposes is such that the tire beads can be damaged by over-stretching during fitting to the wheels. As an alternative, safety pegs have been incorporated in wheels for competition purposes but these create potential leak-points leading to tire deflation and they also constitute stress-raisers in the wheel rim. It is to be noted that the likelihood of beads becoming dislodged is mainly relative to the outboard rim.

According to the present invention there is provided a vehicle road wheel having a safety groove adjacent its outboard rim edge but so as to be within a tyre fitted to the wheel, within which groove a flexible band is fitted so that a tire fitted to the wheel has its outboard bead embraced between the flexible band and the outboard rim edge of the wheel. The provision of the safety groove and band enables the configuration of the wheel rim to be simplified and hence the risk of damaging a tire when fitting it is minimised, particularly in cases where an exceptionally high safety hump is required as discussed above.

It is, furthermore, conventional practice to provide a vehicle road wheel to which can be fitted a tubeless tyre, the wheel itself serving to provide the necessary air-tight seal (by the engagement between its rim and the tire), and being sufficiently stiff to withstand the bending and rotational stresses generated, in use, between the mounting hub, the wheel and the tire. These functions that the wheel has to perform impose requirements on the structure of the wheel and according to the present invention there is also provided a tire sealing member of annular form on which a tire can be fitted so as to be sealed for inflation, the tyre sealing member with a tire fitted to it being for assembly with a vehicle road wheel of split rim form having inboard and outboard rim parts that can be releasably secured together to hold the sealing member in position around the rim parts. The invention also provides an assembly of a tire sealing member as just defined and a vehicle road wheel having inboard and outboard rim parts releasably secured together to hold the sealing member in position around the rim parts, the sealing member being releasable from the rim parts by separating these parts. Since it is the sealing member that seals a tire fitted to it, it can be utilised with a wheel of which the rim parts do not have to be designed to perform this function and their configuration can therefore be chosen to suit the need to retain the sealing member and tire fitted thereto on the rim parts, without consideration being given also to a need to select a configuration that will enable a tire to be fitted to the wheel without damaging the tire or the wheel. Furthermore tire replacement is facilitated since any one of a plurality of sealing members, each fitted to an individual tire, and preferably already inflated and balanced, can be assembled with any one wheel.

The invention also provides an assembly of a tire sealing member as defined above and a wheel having inboard and outboard rim parts releasably secured together to hold the sealing member in position and inboard and outboard nonrigid torque transfer bands respectively fitted to the inboard and outboard rim parts and with which the annular sealing member is engaged. The provision of these bands enables the overall weight of the assembly to be minimised.

Reverting to the provision of a safety groove within which a flexible band is provided (as set out above), in order that tires may be easily fitted, without damage, to the sealing member, and so that the sealing member may be of simple and light-weight construction, it can be the sealing member that is provided with this safety groove adjacent its outboard edge but so as to be within a tire fitted to the sealing member, within which groove the flexible band is fitted so that a tire fitted to the sealing member has its outboard bead embraced between this flexible band and the outboard edge of the sealing member. As the band is flexible it can be fitted in position by first stretching it over an edge of the sealing member.

Advantageously replaceable sealing members of different widths are provided, and corresponding spacers are also provided so that an appropriate separation of the inboard and outboard rim parts can be achieved when the rim parts are secured together. In this way different widths of tires can be simply accommodated.

Figure 2:
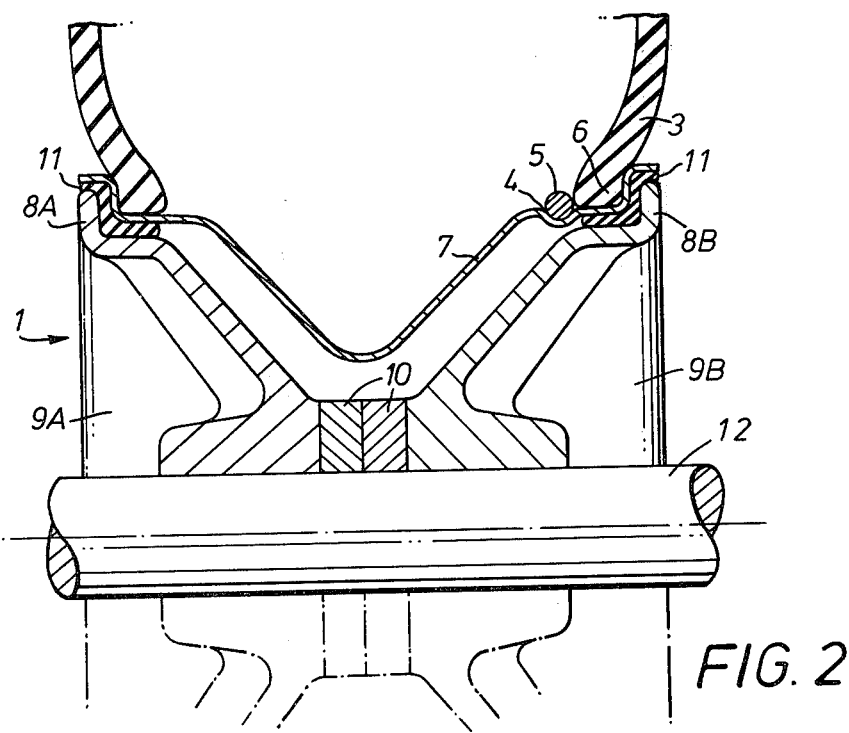
Figure 3:
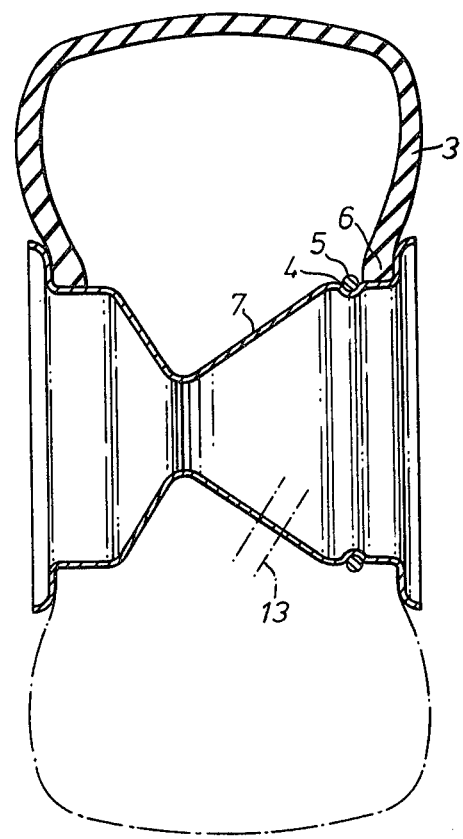
Figure 4:
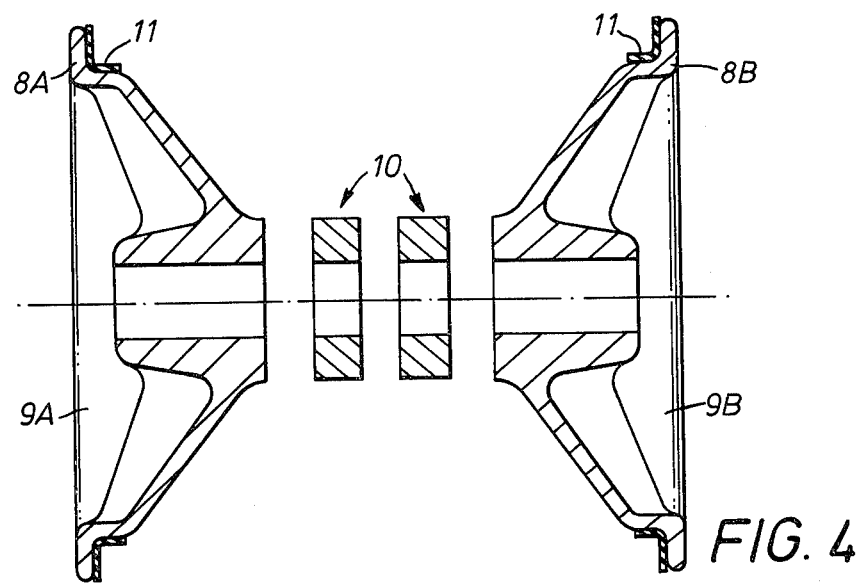

For a better understanding of the invention, and to show how the same may be carried into effect, reference will now be made, by way of example, to the accompanying drawings, in which:

FIG. 1 is a sectional view of one half of a vehicle road wheel shown mounted on a vehicle axle and with a tire fitted to it, FIG. 2 is a view similar to FIG. 1 of a different form, in which the wheel is a part of a wheel and tire sealing member assembly, and in which the tire is fitted to the tire sealing member of this assembly, FIG. 3 is a sectional view of the tire sealing member of FIG. 2, shown with a tire fitted to it, and FIG. 4 is an exploded sectional view of the wheel of the assembly of FIG. 2.

Referring first to FIG. 1 the wheel 1 has inboard and outboard rim portions 2A and 2B. In the outboard rim portion 2B, adjacent its outboard edge but so as to be within a tire 3 fitted to the wheel, there is a safety groove 4 in which is fitted a flexible band 5 so that a tyre fitted to the wheel has its outboard bead 6 embraced between the flexible band 5 and the outboard rim edge.

In the form of FIGS. 2 and 3 the safety groove 4 is in a tire sealing member 7 of annular form that is fitted to the tire 3 and that is held in position around the wheel by inboard and outboard rim parts 8A, 8B terminating respective inboard and outboard body parts 9A, 9B, the body parts (and hence the rim parts) being releasably secured together, for example by bolts (not shown) passed through the central parts of the body parts. In the particular wheel illustrated the rim parts are held at a particular separation, to suit the width of the sealing member, by spacers 10 interposed between the body parts. In the assembled condition the tire sealing member is located around the rim parts 8A, 8B engaged with torque transfer bands 11 each of which is an interference fit on one or other of the rim parts 8A, 8B. These bands 11 are non-rigid in order to prevent fretting in operation and to achieve a satisfactory interference fit.

As in the case of FIG. 1, the tyre 3 fitted, in the case of FIGS. 2 and 3 to the sealing member 7, has its outboard bead 6 embraced between the flexible band 5 in the groove 4 and the outboard rim edge of the wheel which, in the case of FIGS. 2 and 3, is defined by the outboard edge portion of the sealing member 7.

In all cases the axle on which the wheel is mounted is referenced 12.

Due to the provision of the band 5 in the groove 4 the wheel does not require safety humps and ledges of excessive height, or safety pegs. As the band 5 is flexible it can be fitted by stretching it over the rim edge adjacent the safety groove into which the band fits.

Suitable materials for the band 5 are natural or synthetic rubbers or elastomeric plastics.

In the case of the form of FIGS. 2, 3 and 4 the wheel and sealing member assembly 1/7 is mounted on the vehicle axle 12 in conventional fashion (not illustrated), either so as to be removable as a unit, or in a manner such that the inboard body part 9A can remain on the vehicle after the outboard body part 9B and the sealing member 7 with its tire have been removed.

It will be appreciated that the wheel 1 consists of the body parts 9A, 9B with their rim parts 8A, 8B and the torque transfer bands 11 fitted thereto, and the spacers 10, as shown in FIG. 4, although the spacers 10 can be omitted or replaced by one or more spacers of different width. The tire sealing member 7 is a separate component the width of which is suited to the spacing of the wheel rim parts. Sealing members of different widths to suit different combinations of spacers, or no spacers at all, can be provided.

As best shown in FIG. 3, the sealing member 7 has fitted to it the tire 3 before it is incorporated in the wheel and sealing member assembly 1/7. Once the tire is fitted it can be inflated (the location of the inflation vlave being indicated at 13 in FIG. 3) and balanced. Thus a plurality of tyres fitted to sealing members can be prepared for incorporation into wheel/sealing member assemblies 1/7.

As, in use, the sealing member incorporated in the assembly 1/7 is supported by the torque transfer bands 11, the sealing member itself does not have to be sufficiently stiff to withstand the bending and rotational stresses generated between the wheel and the tire in use. Thus the sealing member 7 can be of light weight construction and hence is of an inexpensive nature. This is particularly advantageous in the field of competitive motoring where it is desirable for a selection of tires to be available for fitment to one particular vehicle. As the sealing member is inexpensive a large number of these can have fitted to them a wide range of tires. A smaller number of wheel/sealing member assemblies can then be prepared utilising whatever selection from this range is desirable on any particular day, cost being minimised because the number of wheel components 9A/9B, 10, 11 utilised overall can be kept to a minimum. A further advantage can be gained that is particularly applicable to competitive motoring if the mounting of the wheel on the vehicle is such that the inboard wheel body part 9A remains in position on the vehicle when the outboard body part 9B is removed to permit replacement of the sealing member and tyre. In this case the track setting remains unchanged when the replacement sealing member and tyre is incorporated into the wheel assembly, unless a tyre of different width is substituted with the spacer(s) 10 therefor appropriately changed (or omitted) to suit the different width sealing member required. In this latter case, the track is advantageously automatically modified.

The constructional form of the rim parts can be simplified between these parts do not have to seal the tire, and hence a tire does not have to be fitted over them. As has already been mentioned, in a conventional wheel so-called safety humps and ledges are provided with which the tire beads co-operate so that the tire is retained on the rim. If these humps are increased in height to the extent necessary to be effective under competitive conditions there is the danger that tires will be damaged by over-stretching when fitting them over the humps. The humps can be replaced by so-called safety pegs but the provision of these creates potential leakpoints and stress raisers in the rim. None of these measures is required in the wheel-sealing member assembly 1/7, as the tyre is fitted to the sealing member and the rim parts 8A, 8B have only to be designed to retain the sealing member in position in the assembly. The tire during fitting does not have to be stretched over either of the rim parts.

The likelihood of a tire bead becoming dislodged is mainly relative to the outboard rim and with this in mind there is provided, in the wheel/sealing member assembly 1/7, the safety groove 4 in the sealing member 7 in which is fitted the band 5.

Of the components described, the wheel body parts and rim parts can be formed of metal alloys or rigid plastics; the torque transfer bands can be formed of natural or synthetic rubbers or elastomeric plastics; the sealing member can be of metal alloys or rigid plastics; and the safety band can be a hollow or solid band, or a toroidal spring, made of metal alloys or rigid plastics.

What I claim is:

1. A vehicle road wheel and tire sealing assembly comprising:
   an annular integral tire sealing means for receiving both the inner and outer beads of a tire and for sealing the tire for inflation;
   a vehicle road wheel of split rim form having inboard and outboard rim parts releasably secured together to hold said sealing means in position around the rim parts, the sealing member being releasable from the rim parts by separating these parts; and
   means for transferring torque between said annular tire sealing means and said inboard and outboard rim parts consisting solely of resilient means, including inboard and outboard non-rigid torque transfer bands respectively fitted to the inboard and outboard rim parts and with which inboard and outboard areas of said annular sealing member are respectively engaged to provide a positive but resilient coupling between said wheel and said tire sealing means.

2. A vehicle road wheel and tire sealing member assembly according to claim 1, wherein the sealing member is one of a plurality of tire sealing means that includes tyre sealing means of different widths, and wherein the assembly further comprises a plurality of interchangeable spacer means for mounting between said inboard and outboard rim parts to separate them to fit each of said tyre sealing means, whereby a separation of the rim parts can be obtained to suit any particular tire sealing means.

3. A vehicle road wheel and tire sealing means assembly according to claim 1, wherein the tire sealing means is provided with a groove adjacent its outboard edge but so as to be within a tire fitted to the sealing means, within which groove a flexible band is fitted so that a tire fitted to the tire sealing means has its outboard bead embraced between the flexible band and the outboard edge of the tire sealing means.

4. A vehicle road wheel and tire sealing assembly comprising:

an annular integral tire sealing means for receiving both the inner and outer beads of a tire and for sealing the tire for inflation;

a vehicle road wheel of split rim form having inboard and outboard rim parts releasably secured together to hold said sealing means in position around the rim parts, the sealing member being releasable from the rim parts by separating these parts;

means for transferring torque between said annular tire sealing means and said inboard and outboard rim parts consisting solely of parts resilient means, including inboard and outboard non-rigid torque transfer bands respectively fitted to the inboard and outboard rim parts and with which inboard and outboard areas of said annular sealing member are respectively engaged to provide a positive but resilient coupling between said wheel and said tire sealing means; and said assembly including means for securing said torque transfer bands to extend both radially and axially with respect to said tire sealing means and said inboard and said outboard rim parts.

5. A vehicle road wheel and tire sealing member assembly according to claim 4, wherein the sealing member is one of a plurality of tire sealing means that includes tire sealing means of different widths, and wherein the assembly further comprises a plurality of interchangeable spacer means for mounting between said inboard and outboard rim parts to separate them to fit each of said tyre sealing means, whereby a separation of the rim parts can be obtained to suit any particular tire sealing means.

6. A vehicle road wheel and tire sealing means assembly according to claim 4 wherein the tire sealing means is provided with a groove adjacent its outboard edge but so as to be within a tire fitted to the sealing means, within which groove a flexible band is fitted so that a tire fitted to the tire sealing means has its outboard bead embraced between the flexible band and the outboard edge of the tire sealing means.

* * * * *